United States Patent
Kobayashi et al.

(10) Patent No.: US 6,404,152 B1
(45) Date of Patent: Jun. 11, 2002

(54) MOTOR CONTROL DEVICE

(75) Inventors: Takashi Kobayashi, Hitachiota; Fumio Tajima, Juo-machi; Shoichi Kawamata, Hitachi; Yutaka Matsunobu, Hitachinaka; Ryoso Masaki, Hitachi; Suetaro Shibukawa, Hitachinaka; Osamu Koizumi, Ibaraki-machi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/463,654

(22) PCT Filed: May 19, 1999

(86) PCT No.: PCT/JP99/02635

§ 371 (c)(1),
(2), (4) Date: Jan. 28, 2000

(87) PCT Pub. No.: WO99/63654

PCT Pub. Date: Dec. 9, 1999

(30) Foreign Application Priority Data

May 29, 1998 (JP) ............................................. 10-149941

(51) Int. Cl.[7] ................................................. H02P 6/02
(52) U.S. Cl. ....................................... 318/254; 318/721
(58) Field of Search ................................. 318/798–810, 318/254, 721

(56) References Cited

U.S. PATENT DOCUMENTS

| | | | |
|---|---|---|---|
| 4,088,934 A | * | 5/1978 | D'Atre et al. ............... 318/227 |
| 4,240,020 A | | 12/1980 | Okuyama et al. |
| 4,724,373 A | * | 2/1988 | Lipo ............................ 318/805 |
| 5,134,349 A | * | 7/1992 | Kruse ........................... 318/254 |
| 5,334,923 A | * | 8/1994 | Lorenz et al. ............... 318/805 |
| 5,463,301 A | * | 10/1995 | Kim ............................ 318/801 |

FOREIGN PATENT DOCUMENTS

| JP | 1-318579 | 12/1989 |
|---|---|---|
| JP | 2-106192 | 4/1990 |
| JP | 2-206382 | 8/1990 |
| JP | 8-331884 | 12/1996 |
| JP | 10-234196 | 9/1998 |

* cited by examiner

Primary Examiner—Khanh Dang
(74) Attorney, Agent, or Firm—Crowell & Moring LLP (57) ABSTRACT

In order to reduce undesired sound caused by circular ring oscillation in the diametric direction of the stator by an electromagnetic force, electromagnetic force drift memory stores a drift information of the electromagnetic force causing the circular ring oscillation of the stator. This electromagnetic force drift information is read out according to the position information θ and is supplied to a correction coefficient generating circuitry. Correction coefficient generating circuitry corrects the amplitude component of the activation current wave from by forming correction coefficient β (t) of the activation current so as to cancel the electromagnetic force harmonic component in the diametric direction which component is the component of the circular ring oscillation of the stator.

8 Claims, 8 Drawing Sheets

OSCILLATION MODE m=0

MOTOR CONTROL DEVICE

BACKGROUND OF THE INVENTION

Present invention relates to a control device of a rotating electrical machinery and especially relates to the rotating electrical machinery which is improved so as to reduce electromagnetic oscillation in a diameter direction of a stator of a permanent magnet rotating electrical machinery and undesired sound caused by the electromagnetic oscillation. Permanent magnet rotating electrical machinery usually has a stator and a rotor.

The stator has a stator core formed plural winding slots respectively keeping a same interval and a stator winding which is wound in the winding slot mentioned above.

Magnetomotive force distribution of the stator winding is formed so as to superimpose a space harmonic wave on a sine wave (fundamental wave) and is varied in time in proportion to a stator winding current.

Moreover in an inner diameter side of the stator, an opening part of the winding slot and a teeth part of the stator core are disposed alternatively keeping a same interval, and a magnetism permeance distribution of the stator becomes to contain ripple haveing a cycle made by the winding slot of the stator core.

Magnetic flux density of the magnetic field that the stator forms in the air gap is detemined by a product of a magnetomotive force distribution of this stator and a magnetism permeance of said stator, and this magnetic flux density contains a space harmonic component.

Moreover, the rotor has a permanent magnet fixed by being inserted in a groove provided in the rotor core keeping certain interval.

Accordingly, a magnetic flux density of the magnetic field that the rotor provides in the air gap, contains the ripple in the same way and changes in time because of being turned.

As the magnetic flux density of the air gap is provided by composing the magnetic flux that the stator forms and the magnetic flux that the rotor forms, the magnetic flux density in this air gap is distributed so as to superimpose the harmonic component on the fundamental wave component, and changes in time.

Because a torque acting on the rotor is an angle differentiation of a magnetic energy saved in the air gap, a ripple occurs to a torque generated by the ripple of the magnetic flux density of this air gap.

This torque ripple sometimes causes a case as that a big oscillation in permanent magnet rotating electrical machinery and an undesired sound thereby appears.

In order to reduce the ripple of the torque by controlling the stator winding current, a phase current correction means to correct so as to increase or decrease up to a maximum value of the sine wave within a range of +30 degree of an electrical angle where magnitude of each phase current becomes maximum, and a control device of a synchronism motor prepared with a balancing means which provides a total of the phase current balance are disclosed, for example, in Japanese patent Laid-open No. 8-331884 and U.S. Pat. No. 4,240,020.

By using these means, a method how to correct decreasing of the torque in a rotational direction occured in the transposition of the phase current is suggested.

As a cause of the electromagnetic undesired sound of the rotating electrical machinery, a circular ring oscillation of the stator may be pointed out besides the torque ripple in a rotational direction thereof.

The electromagnetic force of the diameter direction acting on the stator causes the circular ring oscillation of this stator, and it is propagated to a stator frame of a stator periphery so as to vibrate said stator frame to the diameter direction and to generate the undesired sound.

When space degree and frequency of the electromagnetic force harmonic component in the diameter direction, accords to resonance mode and frequency of the stator, the stator produces a resonance so as to occur a big undesired sound. Because the torque ripple is time variation of the electromagnetic force in a tangent direction, the conventional control device to reduce the torque ripple in the rotation direction which is performed up to now, cannot reduce the undesired sound caused by the magnetic force in the diameter direction.

SUMMARY OF THE INVENTION

An object of the present invention is to reduce the oscillation generated by a drift of the electromagnetic force in the diameter direction of the stator in the rotating electrical machinery.

In a control device of a rotating electrical machinery comprising, an inverter disposed between a stator winding and a direct current power supply of said rotating electrical machinery having a rotor formed a stator and the magnetic pole provided a stator winding on a stator core, an activation waveform generating circuit to occur an activation current wave form signal that met a magnetic pole position of said rotor, and a current control circuit to control the inverter so as to supply said activation electric current to the stator winding based on said activation current wave form signal and a stator winding current detecting signal, the present invention is characterised by comprising an electromagnetic force drift memory for memorizing a drift information of the electromagnetic force in diameter direction of the stator to act on the stator core having a stator winding thereon, and an activation waveform correction means to correct an amplitude of said activation current wave form signal based on an electromagnetic force drift information which is read from said electromagnetic force drift memory according to the magnetic pole position of the rotor.

Futhermore, the present invention is characterised by comprising an electromagnetic force drift detecting means for detecting a drift of the electromagnetic force in a diameter direction of the stator to act on the stator core having a stator winding thereon, an electromagnetic force harmonic operation device to calculate an electromagnetic force harmonic component on the basis of a signal detected by said electromagnetic force drift detecting means, a correction information generating circuitry to occur a correction information to correct an electromagnetic force drift in the diameter direction of the stator by reading out the electromagnetic force harmonic component from the electromagnetic force harmonic operation device according to the magnetic pole position of the rotor, and an activation waveform correction means to correct the amplitude of the activation current wave form signal based on the correction information.

DETAILED DESCRIPTION OF THE PREFERRED EMBODIMENTS

Referring to the drawings, the best mode of the embodiment to enforce the present invention will be explained as follows.

Figure 1:
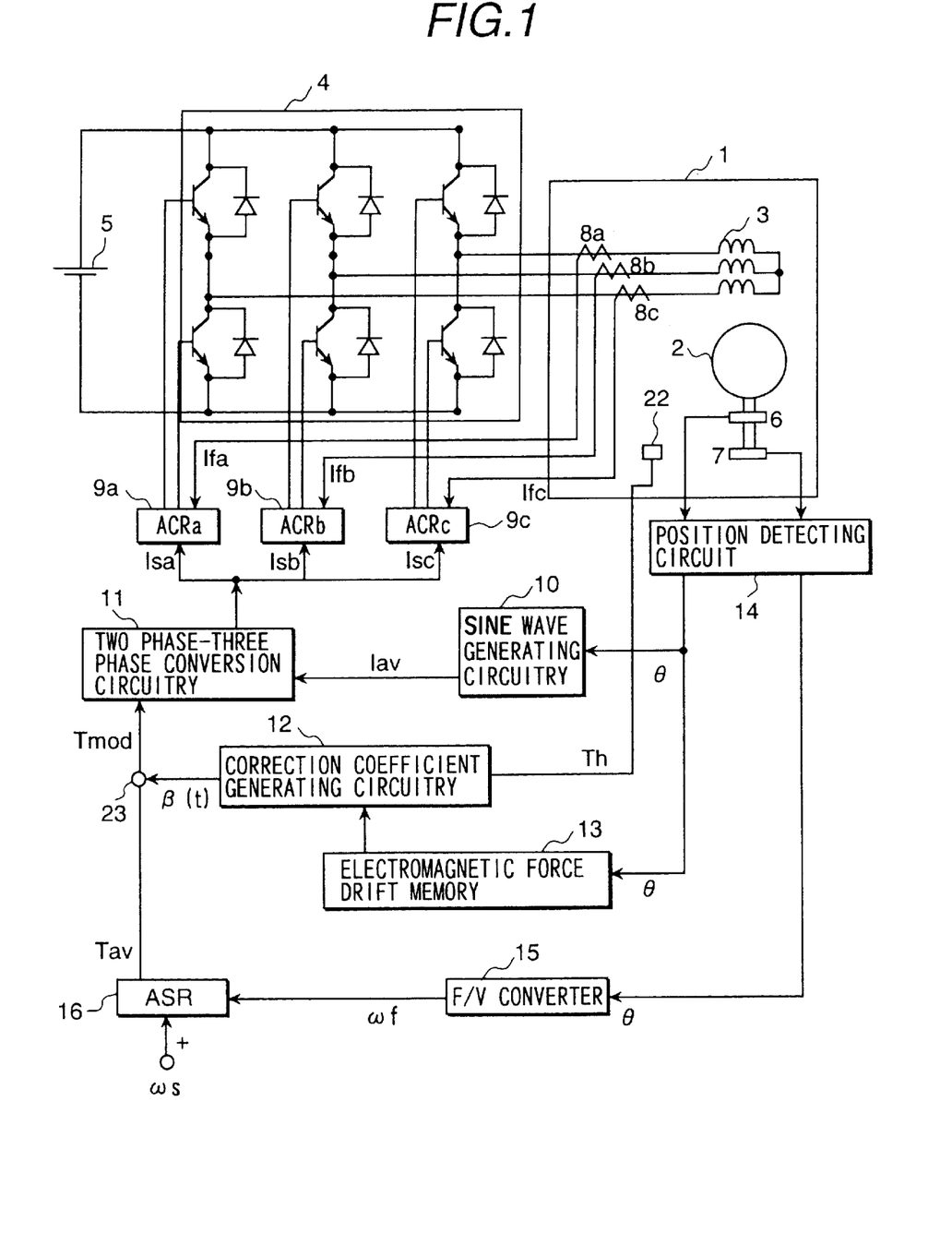
FIG. 1 is a circuitry block diagram of a control device of the permanent magnet rotating electrical machinery as the first embodiment of the present invention.

FIG. 1 is a circuitry block diagram of a control device of a permanent magnet rotating electrical machinery in the first embodiment of the present invention.

Figure 2:
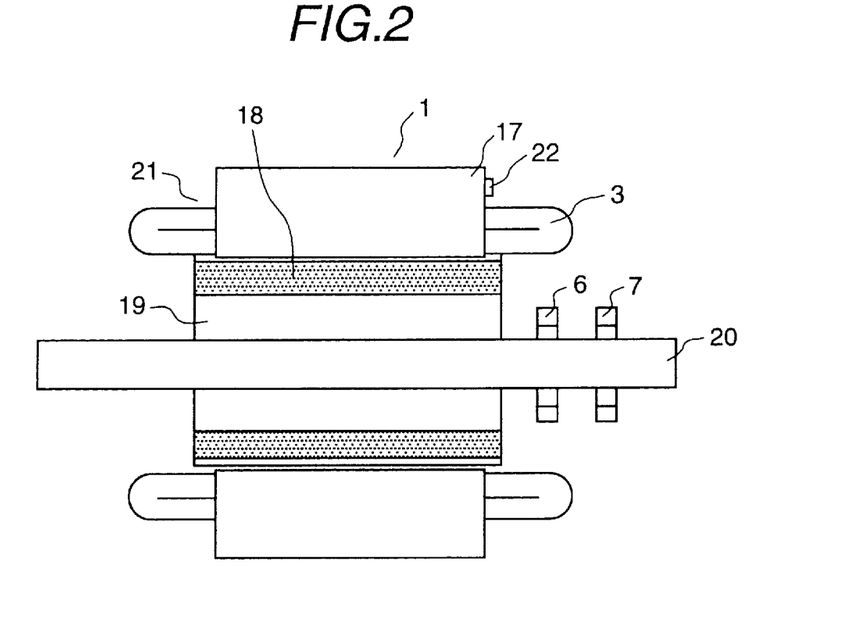
FIG. 2 is a vertical sectional view of the permanent magnet rotating electrical machinery in the first embodiment.
Figure 3:
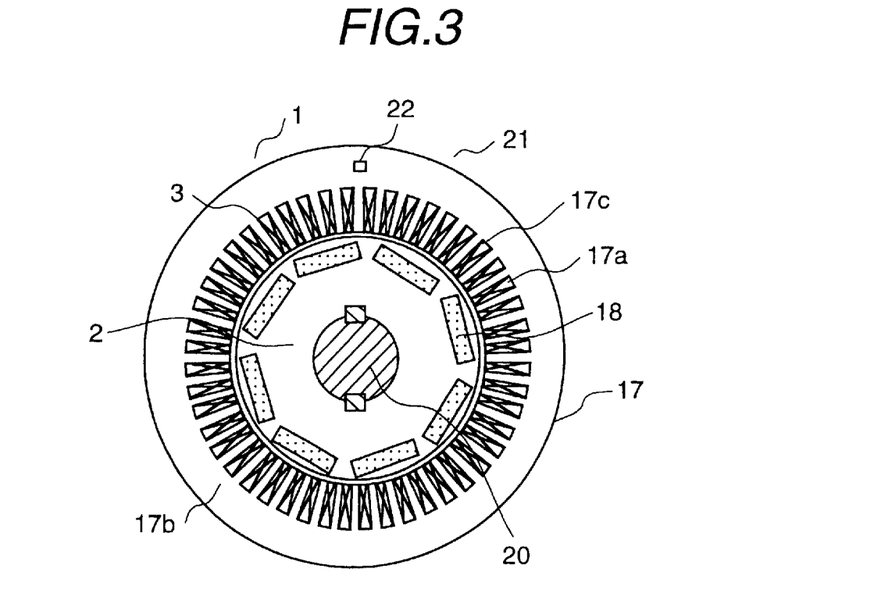
FIG. 3 is a vertical sectional front elevation view of the permanent magnet rotating electrical machinery shown to FIG. 2.

FIG. 2 is a vertical section side view of the permanent magnet rotating electrical machinery in this embodiment, and FIG. 3 is a vertical section from elevation of the above. In FIG. 2 and FIG. 3, reference is a permanent magnet rotating electrical machinery, 2 a rotor, 21 a stator.

The rotor 2 has a rotor core 19 that is provided around a shaft 20 and permanent magnets 18 forming a magnetic pole around the rotor core 19. on the shaft 20 furthermore, a position sensor 6 to detect magnetic pole position of the rotor 2 and an encoder 7 to detect the rotating speed are installed.

On the other hand, stator 21 has a stator core 17, a winding slot 17a formed in the stator core 17, a stator winding 3 wounded in this winding slot 17a so as to generate a rotational magnetic field, and a temperature sensor 22 to detect temperature of the stator core 17.

Further, 17b is a yoke part of the stator core 17, and 17c is a tooth part.

A control device for controlling this permanent magnet rotating electrical machinery 1 will be explained using FIG. 1 in the next.

This control device prepares is provided a speed control function, and an example activated with a current wave form of a sine wave is explained.

Most of a control system performing arithmetic processing is constituted so as to utilize a microcomputer, and the control processing function of the above is indicated as a control circuit here.

An inverter 4 receives an initial power from a direct current power supply 5, and supplies a stator winding current (activation current) to a stator winding 3 of the permanent rotating electrical machinery 1.

A position detecting circuit 14 obtains and outputs a position information θ based on a magnetic pole position detecting signal of the rotor 2 output from the position sensor 6 and a rotating speed detecting signal output from the encoder 7.

The speed control circuitry (ASR) 16 inputs a velocity reference ωs and a real velocity ωf obtained by converting a position information θ from the position detecting circuit 14 with a F/V converter 15, calculates a difference ωe (=ωs−ωf), and outputs a mean torque reference Tav and a phase shift reference when needed need by a PI control (integral section) on the basis of the above.

The sign wave generating circuitry 10 generates a sine wave fundamental wave form (activation current wave form) signal Iav which is same-phase with an induced voltage of the stator winding 3 or is shifted the phase when needed. Based on the position information θ output from the position sensor 6.

The electromagnetic force drift memory 13 stores the drift information of the electromagnetic force to cause circular ring oscillation of the stator 21.

Then, this electromagnetic force drift information begins to be read according to the position information θ, and it is supplied to a correction coefficient generating circuitry 12.

The correction coefficient generating circuitry 12 generates a correction coefficient β (t) which seems to deny a drift of the electromagnetic force harmonic component as the main component of the circular ring oscillation in a diameter direction of the stator 21, that is, the amplitude component of the activation current.

Here, t shows a time, and the correction coefficient varies with the time.

Because, as the amount of the circular ring oscillation of the stator 21, is influenced by the temperature of the stator core 17, the correction coefficient generating circuitry 12 obtains the correction coefficient β (t) by adding the stator core temperature information Th detected by the temperature sensor 22.

The multiplier 23 calculates a torque reference tmod and makes the correction by multiplying the correction coefficient β (t) into the mean torque reference tav generated by the speed control circuitry (ASR) 16.

The 2 phase–3 phase conversion circuitry 11 inputs the corrected torque reference Tmod and the sine wave fundamental wave form signal Iav and generates a current reference Isa, Isb, Isc for the activation current to flow to the winding of each phase of the stator winding 3.

The phase current control circuit (ACR) 9a, 9b, 9c which controls current of each phase of the stator winding 3, controls the activation current of the each phase by supplying a control signal obtained proportional to the current reference Isa, Isb, Isc and the current detecting signal Ifa, Ifb, Ifc from the current detecting device 8a, 8b, 8c, to the inverter 4, thereby the rotational magnetic field that matches the rotation position of the rotor 2 is generated.

Such drift of the electromagnetic force in the permanent magnet rotating electrical machinery 1 will be explained referring to FIG. 4 and FIG. 5.

Figure 4:
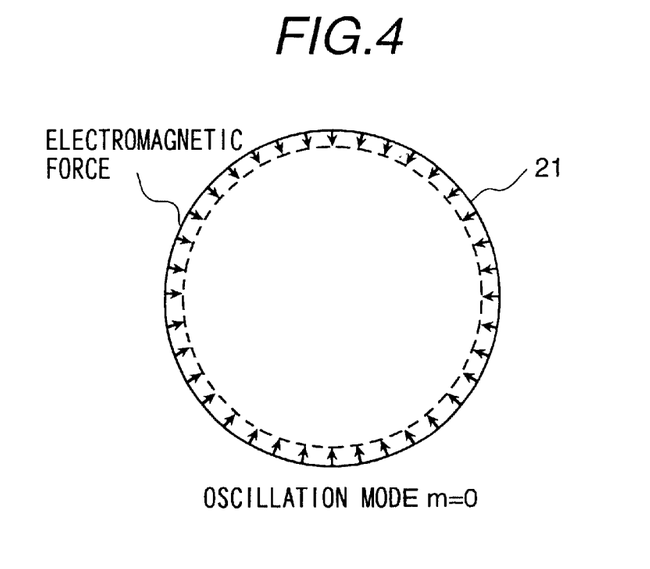
FIG. 4 is a view for showing a oscillation mode of space zero degree in the first embodiment.

FIG. 4 shows an oscillation mode of the stator 21 by the electromagnetic force harmonic of the zero space degree which occurs a big undesired sound with the lowest degree.

The oscillation mode of the zero space degree means a mode in which a node or antinode of the oscillation does not exist.

That is, in this oscillation mode, the stator 21 expands and contracts in a diameter direction uniformly. FIG. 5 shows an electromagnetic force harmonic component of the zero space degree.

In the next, a relationship of the stator winding current and the electromagnetic force in the diameter direction will be explained using FIG. 6 and FIG. 7.

The value of the electromagnetic force in the diameter direction of the stator 21 can be obtained from a relative position of the rotor 2 for the stator 21 and the value of the stator winding current.

Figure 7:
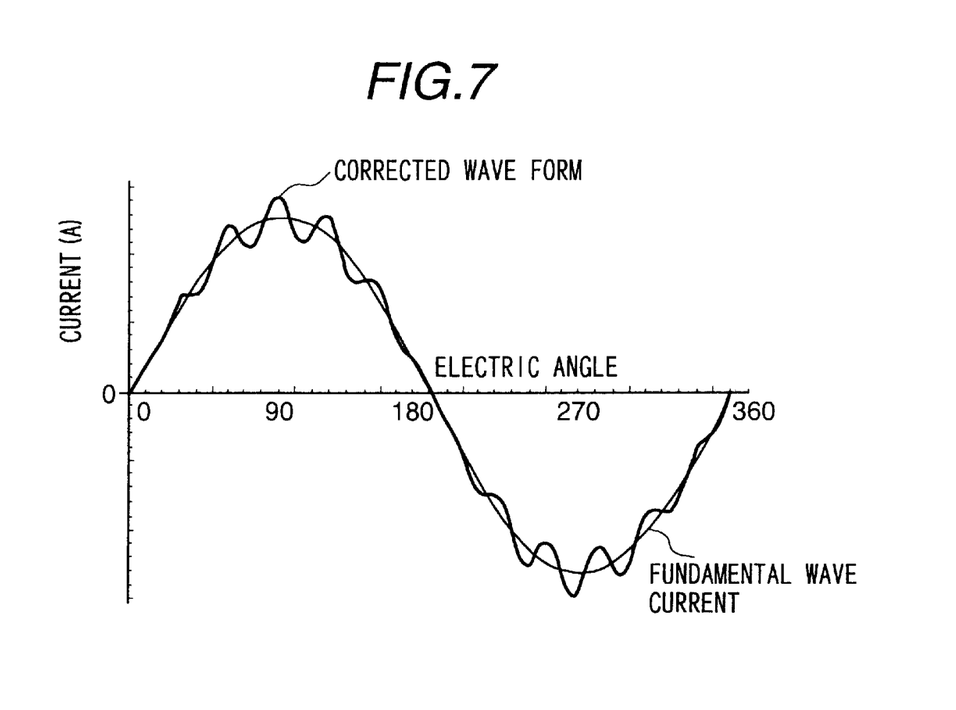
FIG. 7 shows a current wave form flowing through one phase of the stator winding in the first embodiment.

FIG. 7 shows a current wave form in one phase of the stator winding 3.

Figure 5:
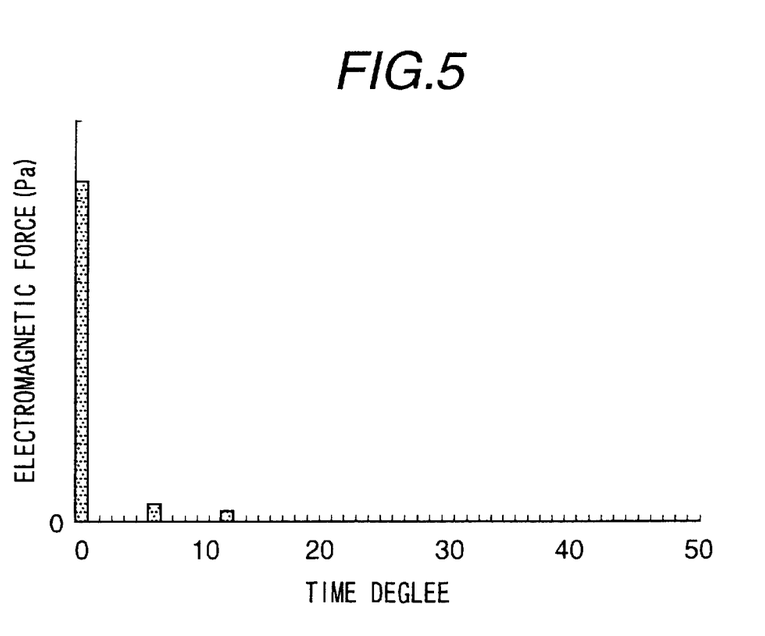
FIG. 5 is a view to show an electromagnetic force harmonic component of the space zero degree in the first embodiment.

In this embodiment, when the sine wave electric current is flowed in the stator winding 3, an electromagnetic force harmonic component of a time degree as shown to FIG. 5 occurs with the oscillation mode shown to FIG. 4.

The biggest component is the zero time degree further. However, because the component of zero time degree is the dc component that does not depend to the time, it acts toward the center direction with the static force, accordingly, the component of the zero time degree does not make a contribution to the oscillation.

In this embodiment, the sixth and the twelfth time degrees became a main component to generate the circular ring oscillation.

When the frequency of the electromagnetic force harmonic accords to the resonance frequency in the oscillation mode of stator 21, the stator 21 resonates so as to produce the big oscillation and the undesired sound.

Here, an example in which the component of the twelfth time degree excitates the resonance, will be explained.

However, the fundamental frequency of the activation current wave form is treated as a standard of the time degree.

Figure 6:
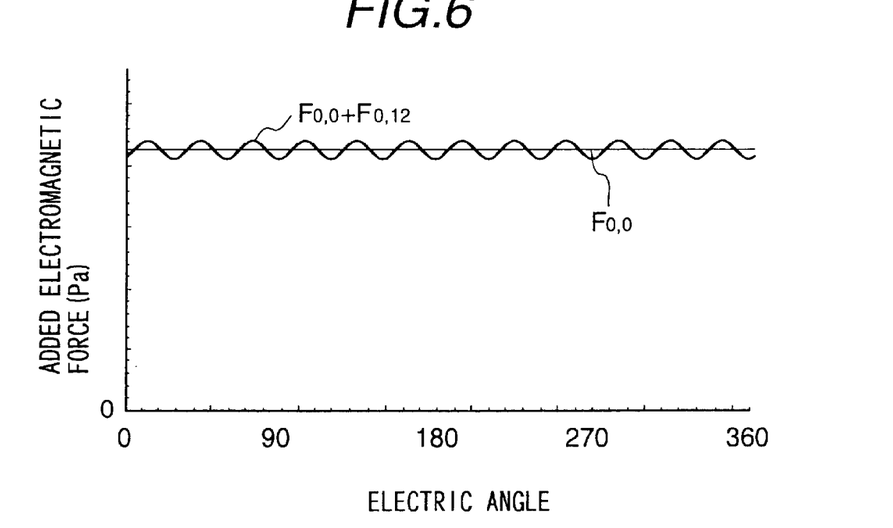
FIG. 6 is a view to show time change of electromagnetic force harmonic component in the first embodiment.

In FIG. 6, the electromagnetic force drift is shown in a case that DC component of the electromagnetic force harmonic component (component of the zero time degree) and the oscillation of the electromagnetic force in the twelfth time degree are added together by considering the phase.

This electromagnetic force drift can be expressed in the next equation (1).

$$F(t) = F_{0,0} + F_{0,12} \sin(12\omega t + \alpha_{0,12}) \quad (1)$$

Here, F 0,0 and F 0,12 respectively means amplitudes of the electromagnetic force harmonic components respectively in the zero space degree and the zero time degree, and the zero space degree and the twelfth time degree.

The code α0,12 means the phase of the electromagnetic force harmonic component in the zero space degree and the twelfth time degree.

These amplitude and phase data can be obtained by an experiment or a harmonic analysis of the numerical analysis.

The activation current wave form of the stator winding 2 becomes a sine wave fundamental wave form to show it in figure The electromagnetic force harmonic component in the zero space degree and the zero time degree, and the zero space degree and the twelfth time degree is varied with the activation current of the stator winding 3.

In the electromagnetic force drift shown in FIG. 6, when electromagnetic exciting force is big, the torque reference is made to be small, and on the contrary, when the electromagnetic exciting force is small, the torque reference is made to be big, thereby, the electromagnetic force is controlled to be constant and the oscillation and the undesired sound can be reduced.

An example to make the electromagnetic force F 0,0 as the constant value will be explained.

First of all, the correction coefficient β (t) which seems to be satisfied with the next equation (2) is obtained.

$$\beta(t) F(t) = F_{0,0} \quad (2)$$

By forming current references Isa, Isb, Isc which transformes the sine wave fundamental wave form (signal Iav) with the correction coefficient β (t), the amplitude of the activation current is controlled as a waveform which is corrected as shown in FIG. 7, thereby, the drift of the electromagnetic force in the diameter direction of stator by time degree the twelfth component is suppressed, and the electromagnetic force may be kept to be F 0,0.

Here, the correction coefficient β (t) can be expressed in the next equation (3).

$$\beta(t) = \frac{F_{0,0}}{F_{0,0} + F_{0,12} \sin(12\omega t + \alpha_{1,12})} \quad (3)$$

$$= \frac{1}{1 + \frac{F_{0,12}}{F_{0,0}} \sin(12\omega t + \alpha_{0,12})}$$

Here, because F 0,12 is fully small comparing it with F 0,0 and a next equation (4) is provided.

$$\beta(t) = 1 - \frac{F_{0,12}}{F_{0,0}} \sin(12\omega t + \alpha_{0,12}) \quad (4)$$

Practically, because of an affection of a magnetic saturation of the core of the stator 21 and the rotor 2, the equation (4) is not corrected enough.

Therefore, it is desirable to use an adjustment variables γ which are variables considering affection of the magnetic saturation further to the correction coefficient β (t).

Then the correction coefficient β (t) may be expressed in the following equation (5).

$$\beta(t) = 1 - \gamma \frac{F_{0,12}}{F_{0,0}} \sin(12\omega t + \alpha_{0,12}) \quad (5)$$

Figure 8:
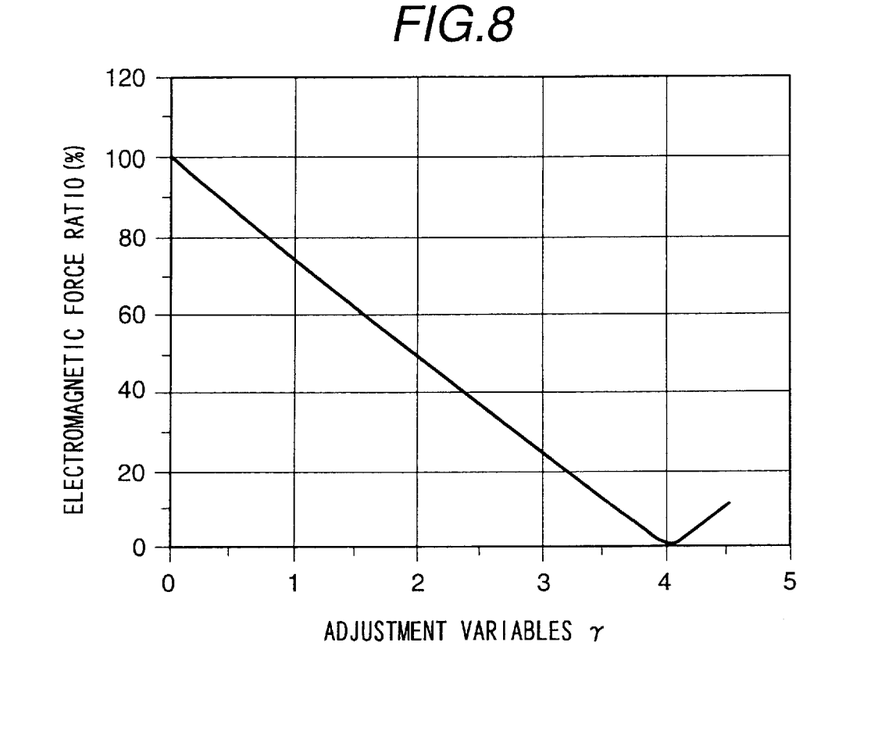
FIG. 8 is a characteristic figure showing change of the electromagnetic force for adjustment variables in the first embodiment.

By using the adjustment variables γ as a parameter, the electromagnetic force harmonic component of the twelfth degree mentioned above is calculated, and the variation of the electromagnetic force harmonic component for this adjustment variables γ is shown in FIG. 8.

When the adjustment variables Y are zero, a condition as that any correctionis not made on at all is shown.

In this embodiment, the case of γ=4 can reduces a ratio of the electromagnetic force to be 1% in comparison with the case of γ=0 (100%).

Accordingly, the oscillation and the undesired sound to originate in this electromagnetic force harmonic component becomes possible to be reduced largely.

In an electromagnetic force drift memory 13, a resonance frequency to be provided by an electromagnetic analysis or an experiment, the electromagnetic force harmonic component which should be reduced, the time degree, the amplitude, and the phase of the harmonic component of the current, and the adjustment variables, are stored by a form such as a table etc.

In the permanent magnet rotating electrical machinery which is prepared with a stator winding of n phase, the harmonic component of the electromagnetic force has periodicity of 180/n degree in electrical angle.

Accordingly, if the data of the electromagnetic force harmonic are stored relating to a current-carrying section of 180/n degree in the electrical angle, they are read out repeatedly and are used to correct it in all sections.

According to the present embodiment, it has an effect as that the oscillation by the circular ring oscillation of the stator 21 and the undesired sound thereby may be reduced.

Moreover, the embodiment using the twelfth time degree is described as above, however, the oscillation and undesired sound in other time degrees, can be reduced in the same way.

Moreover, the correction coefficient β (t) is multiplyed with a mean torque reference value Tav by a multiplier 23 so as to correct the amplitude component of the activation current, thereby to obtain a corrected torque reference Tmod, however, the corrected torque reference Tmod may be obtain by adding the correction component being equivalent to the multiplication to the mean torque reference value Tav.

Moreover, in FIG. 1, the correction signal from the correction coefficient generating circuitry 12 is added to the mean torque reference Tav so that the amplitude component of the activation current is corrected indirectly. However, the correction signal from this correction coefficient generating circuitry 12 may be added directly to a two phase-three phase conversion circuitry 11, thereby the activation current is corrected a shown in FIG. 7.

As an example applied this embodiment next, a case applied to a variable speed motor will be explained.

Figure 9:
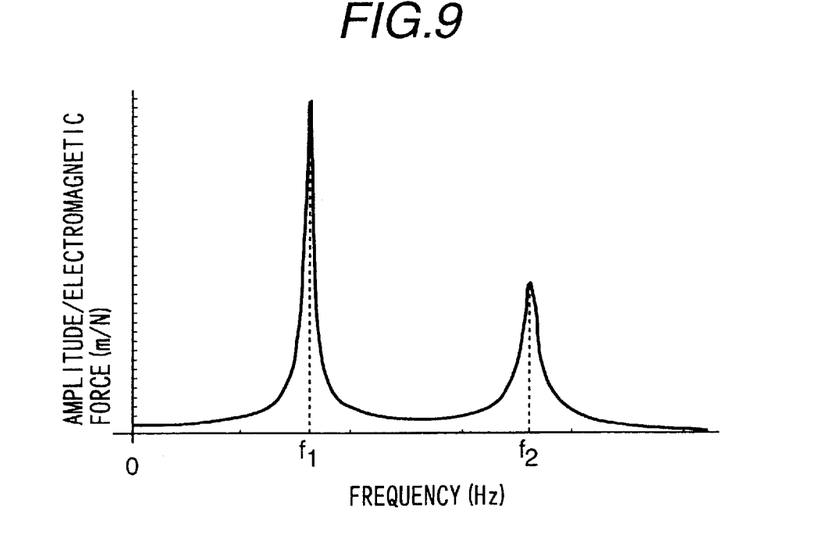
FIG. 9 is a frequency characteristic figure of oscillation amplitude in the first embodiment.

FIG. 9 exemplifies a frequency characteristic of the oscillation amplitude.

In this example, plural resonance frequencies f1, f2 exist in the motor.

When a revolutional speed of the motor is changed and the frequency of the electromagnetic force harmonic component becomes to be close to the resonance frequency f1, f2, the correction function means mentioned above is operated, and when it is driven with an other frequency domain, the correction function means is stopped.

If it is done in this way, in the variable speed motor, the oscillation and the undesired sound can be reduced in the resonance frequency; furthermore processing load of the control system is reduced by omitting control to correct the electromagnetic force drift in the non-resonance region, it becomes possible to to utilize redundant throughput for other control processings.

In next, as a second embodiment of the present invention, an example of a permanent magnet rotating electrical machinery of three phase four pole will be explained.

Figure 10:
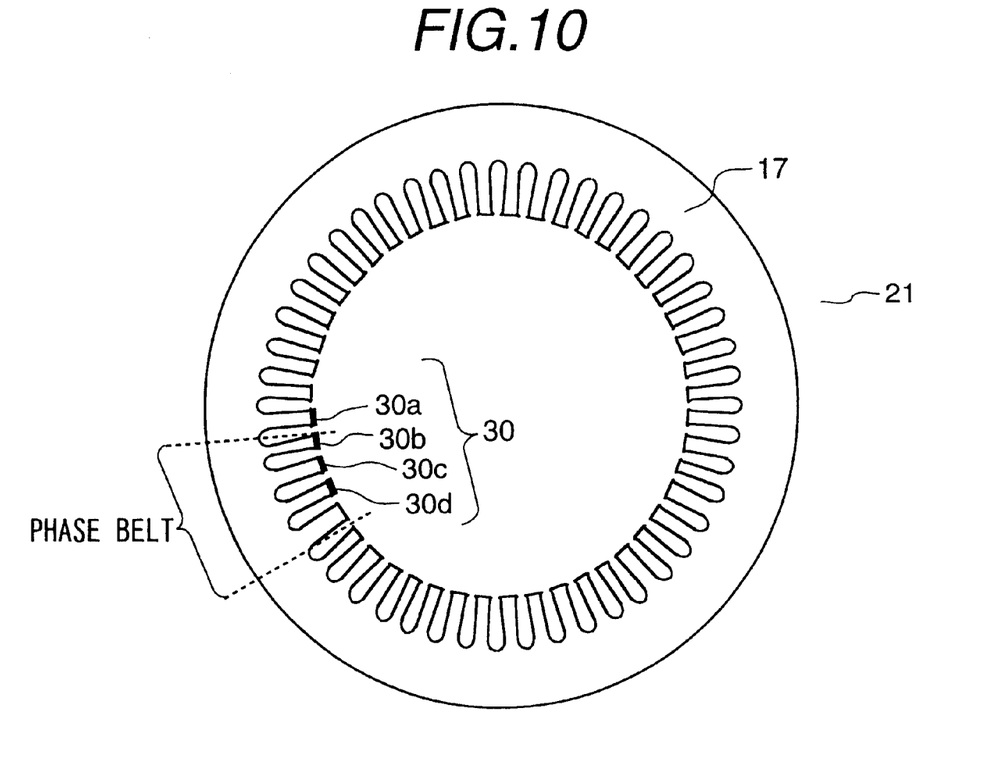
FIG. 10 is a layout drawing of a search coil in the second embodiment of the present invention.

FIG. 10 shows a vertical sectional front view of the stator core of the three phase four pole permanent magnet rotating electrical machinery.

In this embodiment, slot number n spp of the stator core 17 per every pole every phase of the stator 21, is "4". Phase belt of the stator winding 3 of three phase is 60 degree in the electrical angle.

The winding slot number in this phase belt is equal to n spp and it is four.

Moreover, as mentioned above, the harmonic component of the electromagnetic force has a periodicity of 180/n degree in the electrical angle.

That is, the periodicity arises in every phase belt. Accordingly, if the search coils 30a to 30d are provided on four stator winding slot in one phase belt, the harmonic component of the electromagnetic force necessary for the correction control processing can be grasped by a sufficient accuracy.

Figure 11:
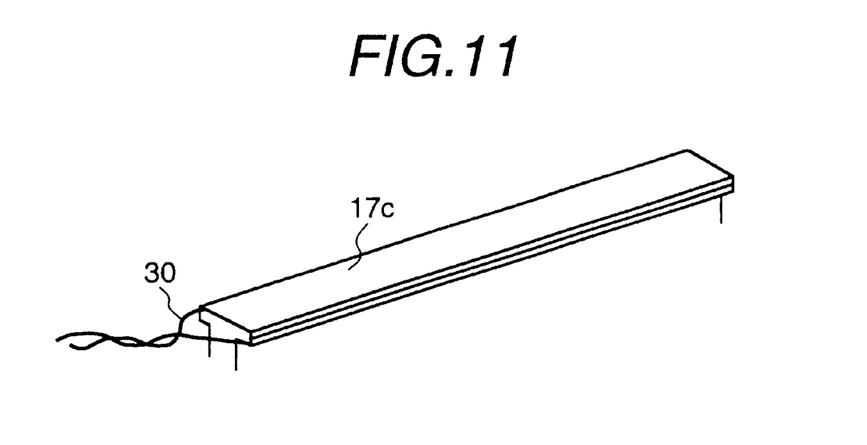
FIG. 11 is a view of a search coil winding in the second embodiment.

Each search coil 30 (30a to 30d) is wound more than one turn so as to surround a teeth part 17c as shown in FIG. 11.

Figure 12:
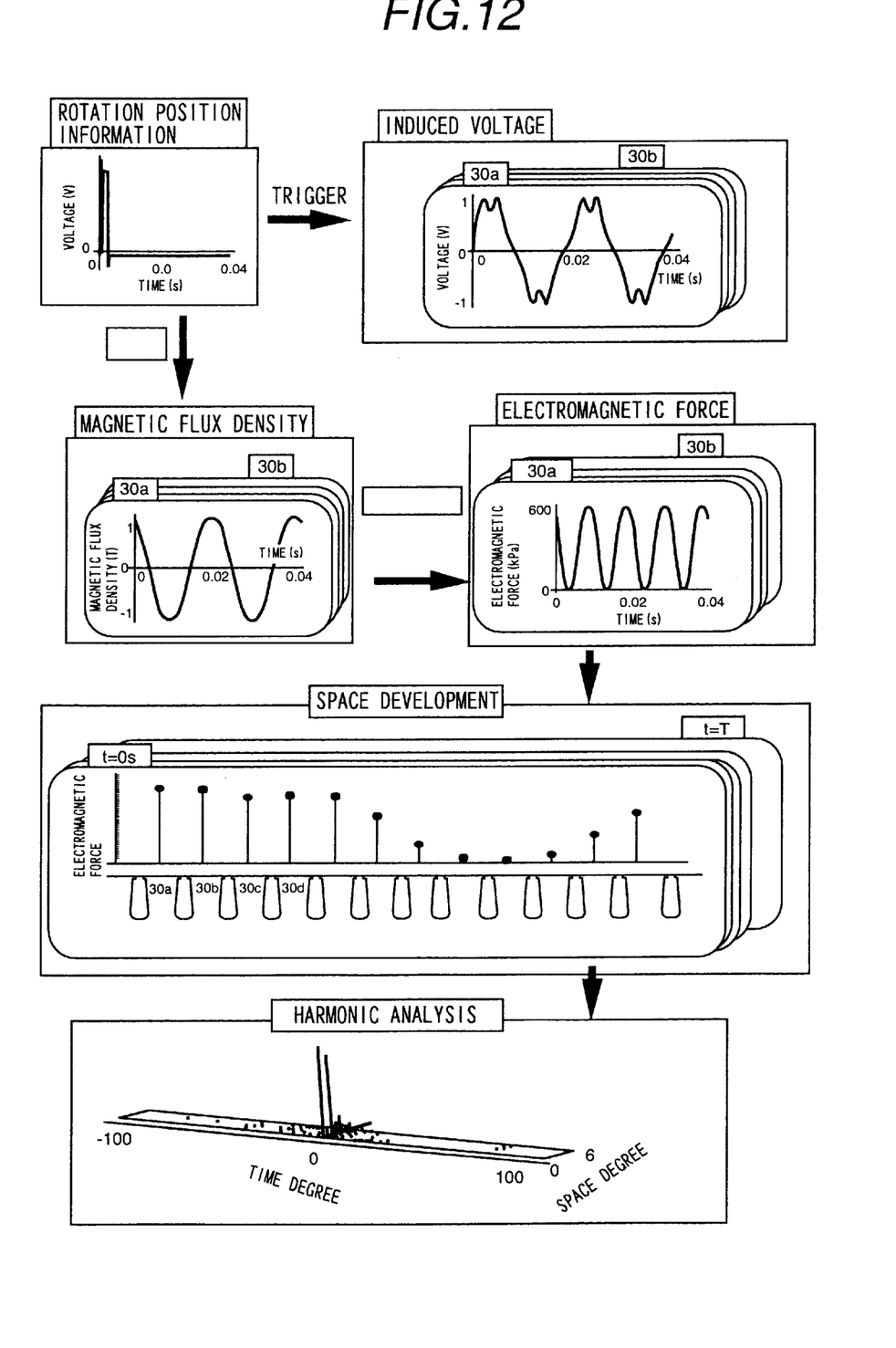
FIG. 12 is a block diagram showing a flow of signal processing in the second embodiment.

FIG. 12 shows a step for the signal processing to calculate the electromagnetic force based on a variation of the magnetic flux interlinkaged with the teeth part 17c.

Figure 13:
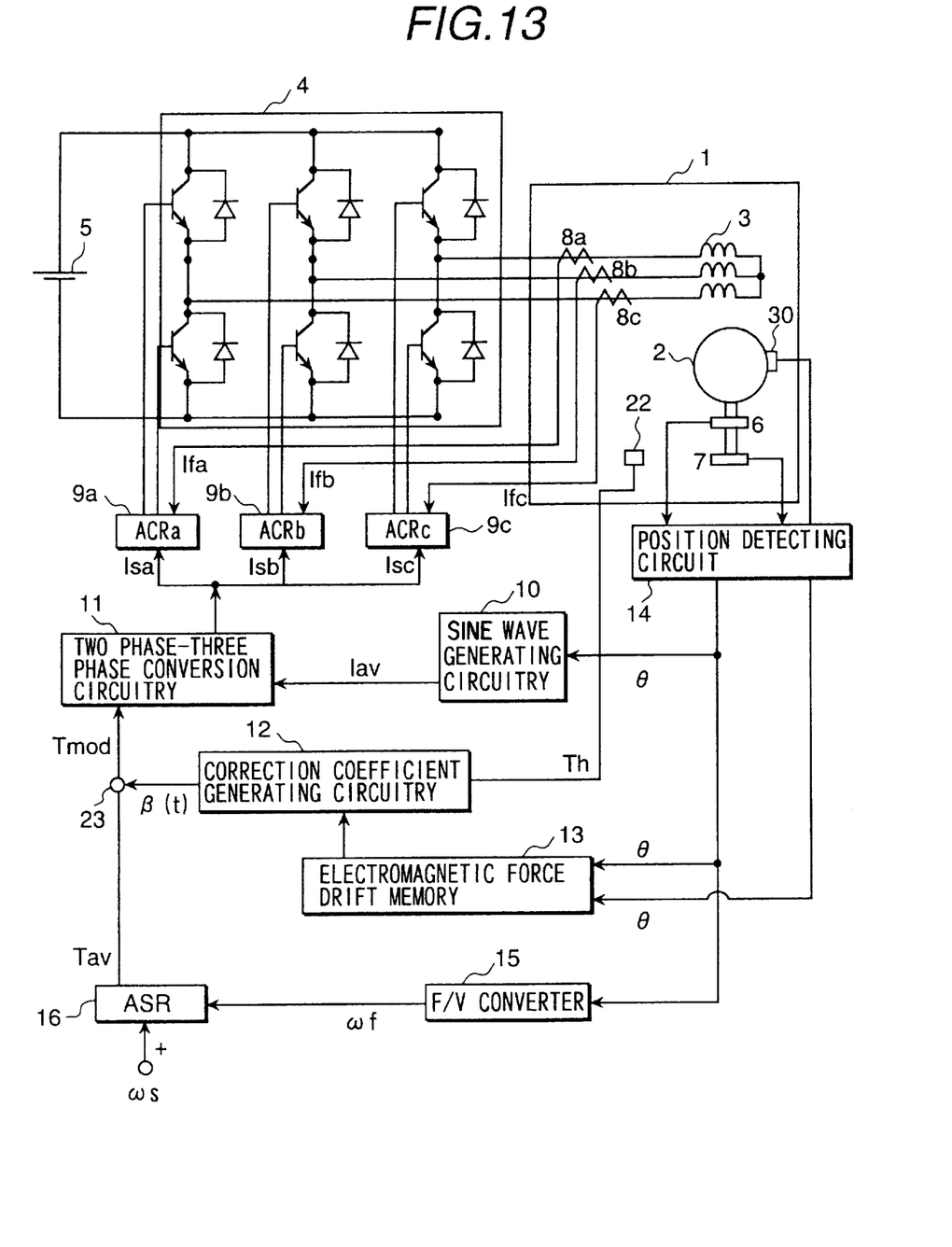
FIG. 13 is a circuitry block diagram of a control device of a permanent magnet rotating electrical machinery in the second embodiment.

Moreover, a circuitry block of the control device corresponding to this signal processing is shown to FIG. 13.

Relating to the permanent magnet rotating electrical machinery and the control device thereof shown to FIG. 13, an equal or equivalent component part with the embodiment shown in FIG. 1, is omitted to be described repeatly by attaching the same reference code.

Referring to the rotation position information signal θ and by using a signal of one set point as a trigger, an induced voltage of the search coil 30a to 30d of each tooth part 17c is measured.

Because this induced voltage is in proportion to a time variation of the magnetic flux which interlinkages to each teeth part 17c, the magnetic flux density can be obtained by integrating this induced voltage signal with the time. This integral can be obtained based on digital quantity or may be used an integrating circuit.

Because the electromagnetic force in the diameter direction of the stator is in proportion to square of the magnetic flux density approximately in the diameter direction, the electromagnetic force can be calculated by operating the magnetic flux density signal into square.

Electromagnetic force data of each tooth part 17c are developed between space, and the harmonic component of the electromagnetic force is calculated by performing an electromagnetic force harmonic operation furthermore.

The harmonic component of the electromagnetic force that the resonance mode and the frequency accord with a dc component is extracted.

This signal processing is performed in an electromagnetic force operating unit 40 shown in FIG. 13.

Based on this operation result, the correction coefficient β (t) is generated from the correction coefficient generating circuitry 12, and the amplitude component of the activation current wave form in the stator winding 3 is corrected by means for multiplying it to the sine wave fundamental wave form.

Further, in this embodiment, an element for detecting a mechanical drift can be used as an electromagnetic force drift detecting means.

An acceleration sensor for detecting the oscillation around the stator core or a microphone for measuring the undesired sound is provided, thereby it becomes possible to take out the harmonic component of the electromagnetic force so as to process it, by a processing technique same as the electromagnetic signal processing as mentioned above.

According to this embodiment, because the electromagnetic force harmonic component can be calculated correcponding to aged deterioration of the electric motor and the load machine, there is an effect to reduce the oscillation and the undesired sound furthermore.

According to the present invention as stated above, there is a remarkable effect as that the oscillation of the diameter direction generated by the electromagnetic force of the rotating electrical machinery can be reduced, and the undesired sound to originate in this oscillation is reduced.

What is claimed is:

1. A control device for a rotating electrical machinery having a stator with a stator winding for a stator core and a rotor with a magnetic pole having a plurality of permanent magnets formed thereon, comprising an inverter operatively connected with said stator winding and a direct current power supply, activation waveform generating circuitry for generating an activation current wave form signal corresponding to a magnetic pole position of said rotor, and current control circuitry for controlling said inverter so as to flow an activation current into said stator winding based on said activation current wave form signal and a detecting signal to detect a current flown in said stator winding, an electromagnetic force drift memory for storing drift information of said electromagnetic force in a diametric direction of said stator acting on said stator core having said stator winding, and an activation waveform correction means for correcting an amplitude of said activation current wave form signal based on electromagnetic force drift information read from said electromagnetic force drift memory according to said magnetic pole position of said rotor.

2. A control device for a rotating electrical machinery having a stator with a stator winding for a stator core and a rotor with a magnetic pole having a plurality of permanent magnets formed thereon, comprising an inverter operatively connected with said stator winding and a direct current power supply, activation waveform generating circuitry for generating an activation current wave form signal corresponding to a magnetic pole position of said rotor, and current control circuitry for controlling said inverter so as to flow an activation current into said stator winding based on said activation current wave form signal and a detecting signal to detect a current flown in said stator winding, an electromagnetic force drift detecting means for detecting a drift of the electromagnetic force in a diametric direction of the stator to act on the stator core having a stator winding there, an electromagnetic force harmonic operation device to calculate an electromagnetic force harmonic component on the basis of a signal detected by said electromagnetic force drift detecting means, correction information generating circuitry to provide a correction information to correct an electromagnetic force drift in the diameter direction of the stator by reading out the electromagnetic force harmonic component from the electromagnetic force harmonic operation device according to the magnetic pole position of the rotor, and activation waveform correction means to correct the amplitude of the activation current wave form signal based on the correction information.

3. A control device for a rotating electrical machinery as defined in claim 1, wherein said activation current wave form is a sine wave.

4. A control device for a rotating electrical machinery as defined in claim 1, wherein a space degree of harmonic component of said electromagnetic force is zero.

5. A control device for a rotating electrical machinery as defined in claim 1, wherein said rotating electrical machinery has a stator winding of n phase, and a section to store an harmonic component of said electromagnetic force is 180 degree/n in electrical angle.

6. A control device for a rotating electrical machinery as defined in claim 2, wherein said electromagnetic force drift detecting means is one of an electric signal detection element, an oscillation detecting element and an undesired sound measurement element.

7. A control device for a rotating electrical machinery as defined in claim 1, wherein correction of said activation current wave form is performed by limiting within a resonance region.

8. A control device for a rotating electrical machinery as defined in claim 1, wherein means is provided to change a correction characteristic of said activation current wave form according to a temperature of said rotating electrical machinery.

* * * * *